United States Patent
Kowalewski

(10) Patent No.: US 7,349,443 B2
(45) Date of Patent: Mar. 25, 2008

(54) METHOD AND DEVICE FOR SYNCHRONIZING DATA TRANSFER DEVICES

(75) Inventor: Frank Kowalewski, Salzgitter (DE)

(73) Assignee: IPCOM GmbH & Co. KG, Pullach (DE)

( * ) Notice: Subject to any disclaimer, the term of this patent is extended or adjusted under 35 U.S.C. 154(b) by 1046 days.

(21) Appl. No.: 10/181,009

(22) PCT Filed: Dec. 23, 2000

(86) PCT No.: PCT/DE00/04651

§ 371 (c)(1),
(2), (4) Date: Nov. 12, 2002

(87) PCT Pub. No.: WO01/52490

PCT Pub. Date: Jul. 19, 2001

(65) Prior Publication Data

US 2003/0137972 A1    Jul. 24, 2003

(30) Foreign Application Priority Data

Jan. 14, 2000    (DE) ............................... 100 01 491

(51) Int. Cl.
*H04Q 7/00*    (2006.01)
(52) U.S. Cl. .................... 370/509; 370/516; 375/355
(58) Field of Classification Search ................ 370/503, 370/441, 442, 509, 512, 516; 375/355, 354, 375/356, 144; 455/67.14
See application file for complete search history.

(56) References Cited

U.S. PATENT DOCUMENTS 3,727,134 A * 4/1973 Melvin ........................ 375/283
4,777,640 A * 10/1988 Turner et al. ................ 375/371
5,524,282 A * 6/1996 Honma et al. ........... 455/67.16
5,790,951 A * 8/1998 Tayloe et al. ................ 455/427

(Continued)

FOREIGN PATENT DOCUMENTS

EP    0 180 066    5/1986

(Continued)

OTHER PUBLICATIONS

Klein et al., "Zero Forcing and Minimum Mean-Square-Error Equalization for Multiuser Detection in Code-Division Multiple Access Channels", IEEE Trans. Vehic. Tech., vol. 45 (1996), 276-287.

Primary Examiner—John Pezzlo
(74) Attorney, Agent, or Firm—Kenyon & Kenyon LLP

(57) ABSTRACT

A method and a device for synchronizing data-transmission devices, in which devices a data signal is transmitted in the form of a stream of data bursts between a first station and a second station. A reference signal is transmitted in connection with the specific data burst. In a first step, a first reference signal is sent from the second station to the first station. In a second step, a channel estimation is carried out in the first station based on the reference signal received from the second station. In a third step, the first station sends to the second station a data burst predistorted on the basis of the channel estimation. In a fourth step, the first station sends to the second station a second reference signal altered on the basis of the channel estimation. In a fifth step, the second station synchronizes the data burst on the basis of the second reference signal.

12 Claims, 6 Drawing Sheets

U.S. PATENT DOCUMENTS

| | | | |
|---|---|---|---|
| 5,850,393 A * | 12/1998 | Adachi | 370/335 |
| 5,933,424 A * | 8/1999 | Muto | 370/342 |
| 6,615,024 B1 * | 9/2003 | Boros et al. | 455/67.14 |
| 6,985,548 B1 * | 1/2006 | Jabbar et al. | 375/355 |
| 7,031,739 B1 * | 4/2006 | Imura | 455/522 |
| 7,280,583 B1 * | 10/2007 | Kowalewski et al. | 375/144 |

FOREIGN PATENT DOCUMENTS

| | | |
|---|---|---|
| EP | 0 928 088 | 7/1999 |
| WO | WO 99 56441 | 11/1999 |

* cited by examiner

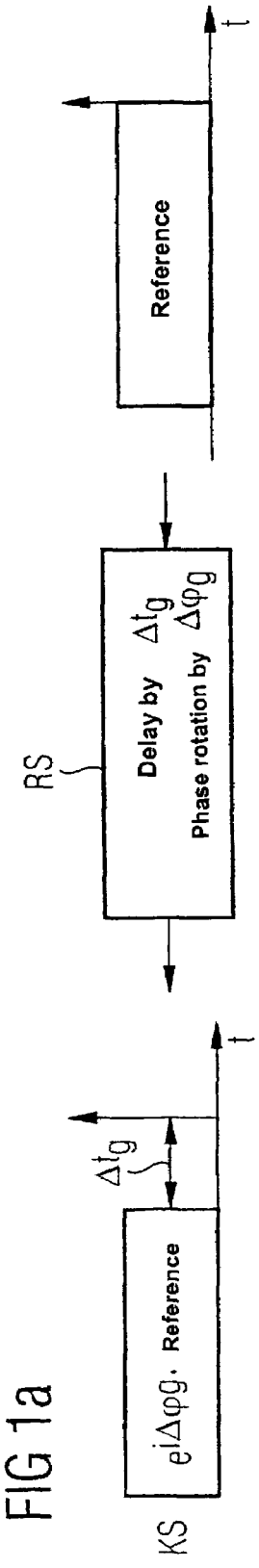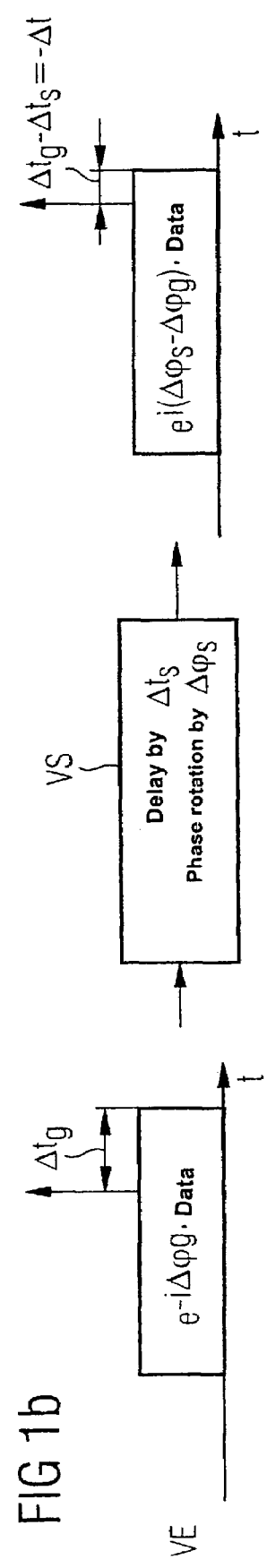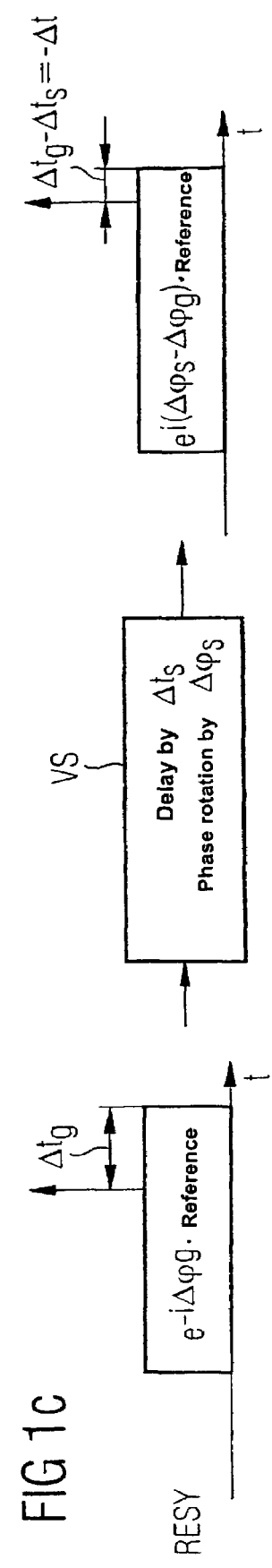

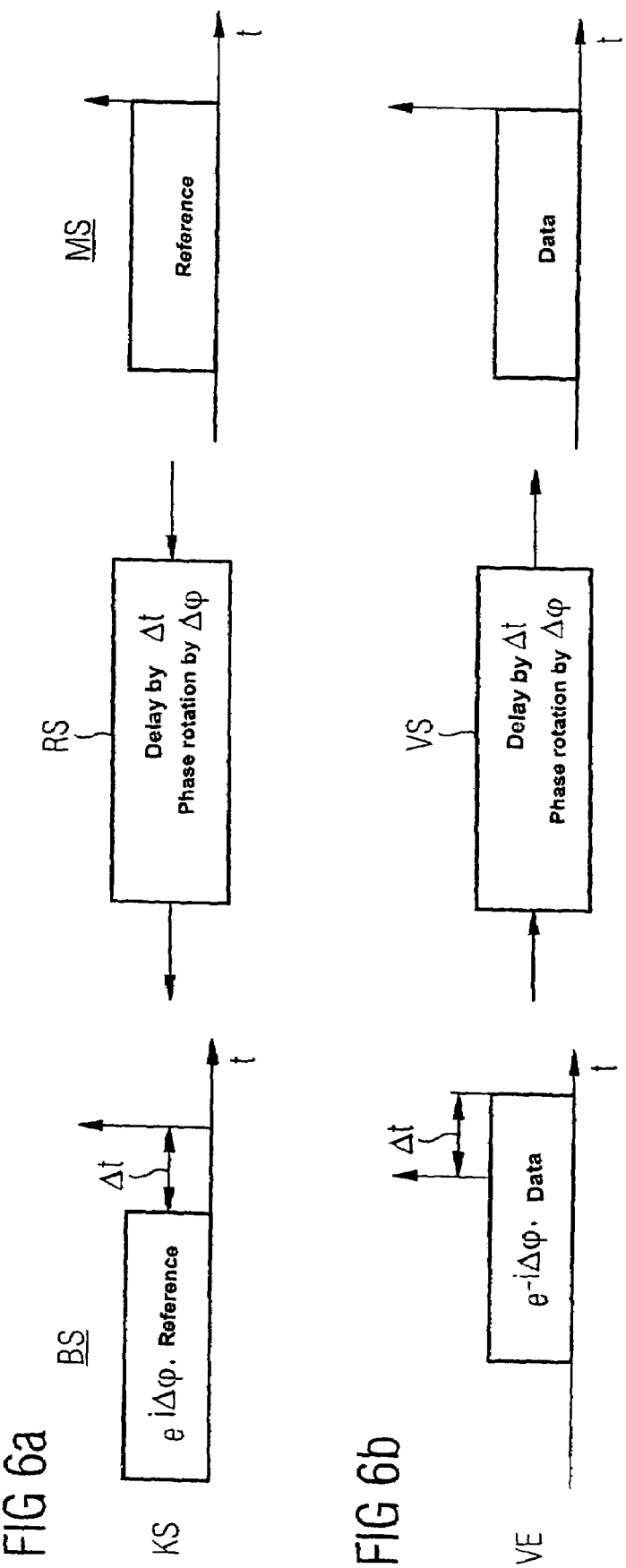

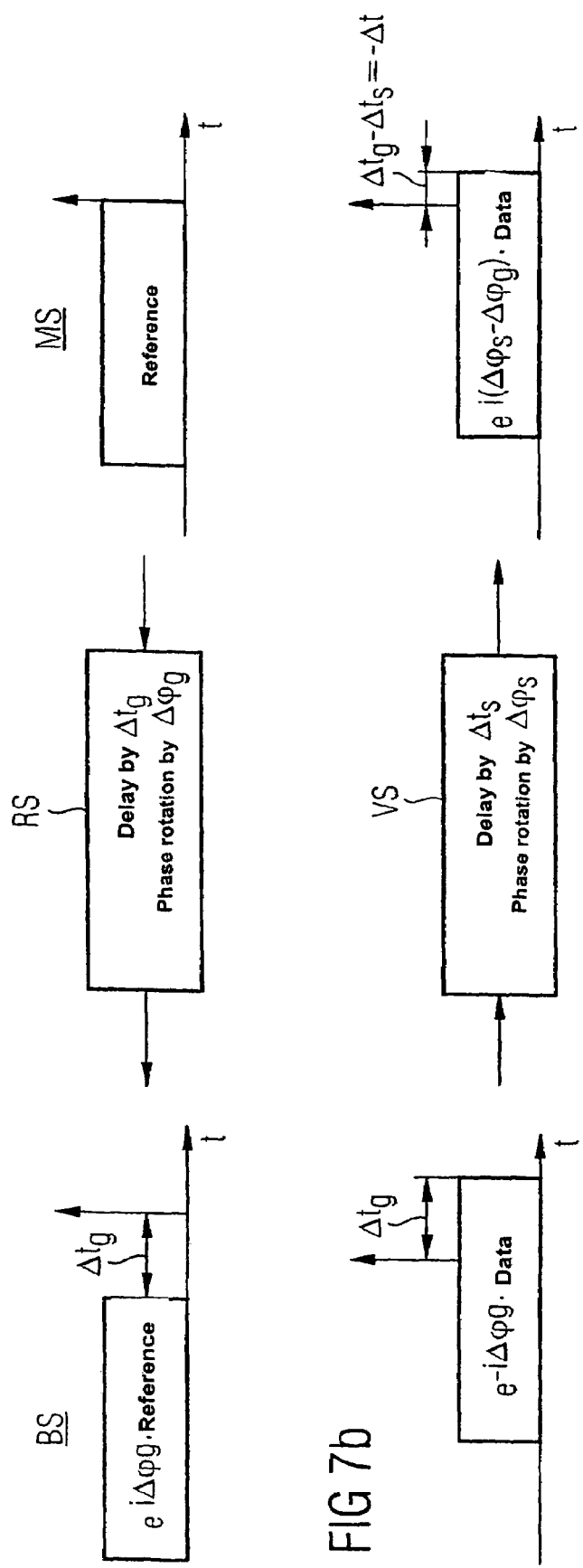

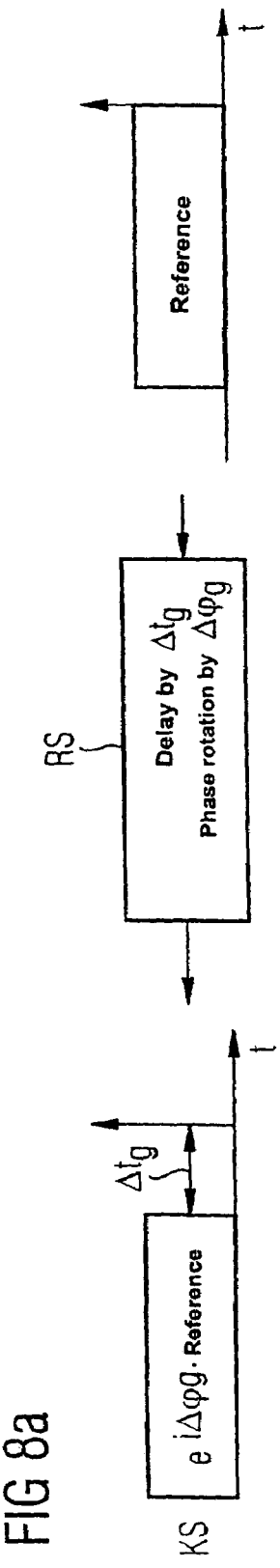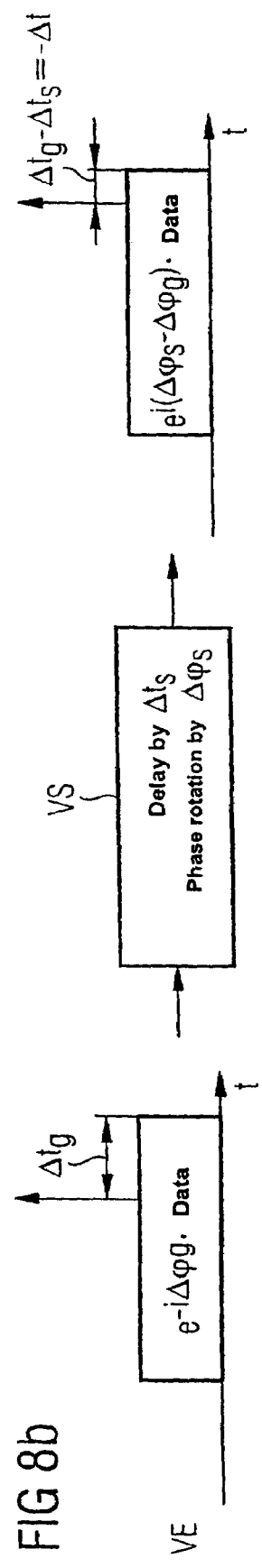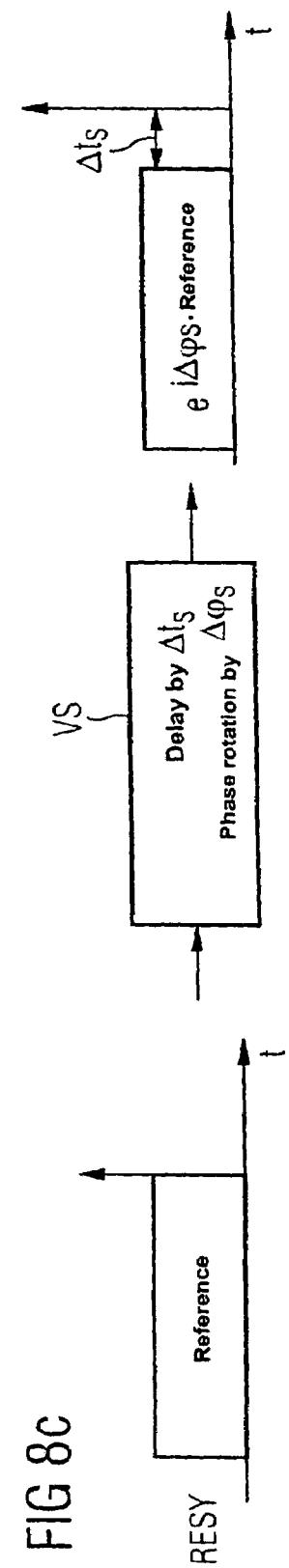

METHOD AND DEVICE FOR SYNCHRONIZING DATA TRANSFER DEVICES

FIELD OF THE INVENTION

The present invention relates to a method for synchronizing data-transmission devices, in which devices a data signal is transmitted in the form of a stream of data bursts between a first station and a second station, a reference signal being transmitted in connection with the specific data burst. The present invention also relates to a corresponding device for synchronizing data-transmission devices.

Although applicable in principle to any data transmissions, the present invention and the idea upon which it is based are explained with reference to a cellular CDMA data-transmission system (CDMA=code division multiple access) which uses a transmission mode that requires the transmission of a reference signal.

BACKGROUND INFORMATION

Using code multiple access (CDMA=code division multiple access), a plurality of data streams can be transmitted simultaneously via a shared frequency band. In so doing, the symbols of the data streams to be transmitted are modulated by so-called interleaving codes.

The data streams transmitted simultaneously with various codes mutually interfere with each other, among other things: multipath propagation leads to overlapping of data symbols sent in succession (inter symbol interference, ISI). CDMA coding and multipath propagation are the cause of multiple access interference, (MAI). The interferences can be eliminated, for example, in the receiver if the pulse response of the channel is known there, as can be gathered from K. D. Kammeyer: "Nachrichtenübertragung", 2nd edition, Information Technology series, Teubner, Stuttgart, 1996, and from A. Klein, G. K. Kaleh and P. W. Baier: "Zero Forcing and Minimum Mean-Square-Error Equalization for Multiuser Detection in Code-Division Multiple Access Channels", IEEE Trans. Vehic. Tech., Vol. 45 (1996), 276-287. For example, the channel pulse response can be estimated in the receiver from a received reference signal.

However, interferences can also be eliminated in the transmitter if the channel pulse responses are known there. The channel pulse response is then no longer estimated in the receiver, but rather in the transmitter. Thus, the transmission of a reference signal from the receiver to the transmitter is necessary.

In particular, ISI and MAI can be eliminated in the transmitter by joint predistortion, (JP).

However, for forwarded data to be able to be detected by the receiver, the receiver must be synchronized to the transmitter. This is usually done by evaluation of the reference signal, transmitted at the same time, in the receiver (see, for example, B. Sklar, "Digital Communications", Prentice Hall Int. Inc., Englewood Cliffs, 1988).

Transmission systems having interference elimination in the receiver and systems having elimination in the transmitter can also be combined with one another, as is known from Bosch: "Mixed Use of Joint Predistortion and Joint Detection in the UTRA TDD Mode", ETSI Tdoc SMG2 UMTS-L1 205/98.

FIG. 3 shows a customary data burst structure in a CDMA data-transmission system, particularly a cellular CDMA data-transmission system, that operates in time division duplex (TDD).

In FIG. 3, B designates a data burst, t designates the time, DB1 designates a first data block, DB2 designates a second data block and RS designates a reference-signal data block.

FIG. 4 shows a schematic representation of the high-frequency (HF) processing in a known CDMA data-transmission system, and specifically, FIG. 4a in the reverse link and FIG. 4b in the forward link.

In FIG. 4, BS designates a base station, MS designates a mobile station, EHF designates a specific reception HF stage, SHF designates a specific transmission HF stage, RS designates a reverse link and VS designates a forward link.

In the reverse link, spread data signals and reference signals are transmitted, for example, via data bursts B shown in FIG. 3, to the base station for channel estimation.

In forward link VS, spread data signals are initially predistorted in a predistortion device VE, the result of the channel estimation in the reverse link being used, and then transmitted to the mobile station. Reference signals are transmitted without predistortion in the forward direction.

FIG. 5 shows a representation of the time sequence in the case of TDD operation with predistortion for the CDMA data-transmission system according to FIG. 4.

First of all, mobile station MS sends a data burst with a reference-signal data block RS to base station BS, which uses it for the channel estimation. Based on the result of the channel estimation, predistortion device VE carries out a predistortion and sends corresponding, predistorted, spread data signals in the form of data bursts B to the mobile station.

FIG. 6 shows an illustration of the shift in the moment of transmission in a known JP method given identical forward and reverse links, and specifically FIG. 6a in the reverse link and FIG. 6b in the forward link.

Generally stated, the known JP methods control the precise transmission moment of the data in forward link VS as a function of the channel estimations of reverse link RS. If the channel estimations contain very early channel pulse responses, transmission is carried out late and vice versa. If the transmission links are identical in the forward and reverse direction, this mechanism saves a synchronization adjustment in the receiver (here mobile station MS), since the signals reach the receiver at the same moment, regardless of the transmission-channel delay.

The time relationships of the channel estimation of reverse link RS used in the predistortion are shown in FIG. 6a, and the relationships of forward link VS are shown in FIG. 6b.

As can be seen in FIG. 6a, mobile station MS sends a data burst B with a reference signal at a specific moment via reverse link RS to base station BS. In so doing, the reference signal experiences a delay by $\Delta t$ (propagation delay) and a phase rotation by the angle $\Delta \phi$.

From this, a channel estimation KS is created, which in turn is used for determining the predistortion parameters for predistortion VE. In the forward direction, the signals to be transmitted likewise experience a delay by the time span $\Delta t$, and a phase rotation by the angle $\Delta \phi$. However, the predistortion offsets this by the derivative action $\Delta t$ and the negative phase rotation $\Delta \phi$, so that a synchronization of the data in data burst B is also achieved simultaneously.

The transmission links in the forward and reverse directions also include the HF parts of transmitter and receiver used in each case. They cause, inter alia, different delay times in forward and reverse links VS and RS, respectively. In addition, the delay times of forward and reverse links VS and RS differ in the case of variable channels (as, for example, in the case of receiver and transmitter moved relatively to each other), because the forward link and reverse link are used one after the other in time. Since only the delay time of the counter link is taken into account by the known JP method, the delay time of the transmit link is additionally taken into account by a synchronization mechanism in the receiver.

FIG. 7 shows an illustration of the shift in the moment of transmission in a known JP method, given delay differences in the forward and reverse links, and specifically, FIG. 7a in the reverse link and FIG. 7b in the forward link, when no synchronization is used.

According to FIG. 7a, the delay in the reverse link is $\Delta t_g$ and the phrase rotation in the reverse link is $\Delta \phi_g$. Since in forward link VS, the delay and phase rotation are different, namely, $\Delta t_s$ and $\Delta \phi_s$, respectively, the data are asynchronous by the time interval $-\Delta t = \Delta t_g - \Delta t_s$.

The shifts in moment of transmission of known JP methods are taken into account automatically by synchronization mechanisms based on reference signals, if filters are used for the predistortion and these filters are also used on the reference signals.

However, this has the disadvantage that no standard JP methods not based on filters can be used. Standard JP methods can supply better transmission qualities, however, than JP methods based on filters.

Customary synchronization mechanisms, which are based on reference signals that are not predistorted, do not take the shifts in transmission moment of JP methods into account.

FIG. 8 shows an illustration of the synchronization in a known JP method given delay differences in the forward and reverse links, and specifically, FIG. 8a in the reverse link and FIG. 8b, and FIG. 8c in the forward link.

It can be gathered from FIG. 8 that the data signals are sent shifted in time due to predistortion, but not the non-predistorted reference signal. Therefore, a synchronization RESY based on the non-predistorted reference signal does not, inter alia, find the synchronization moment desired for the data, but rather is asynchronous by $\Delta t_s$.

SUMMARY OF THE INVENTION

The idea on which the present invention is based is that the reference signal in the forward direction is changed, taking into account the channel estimation in the reverse direction, and is then used in the second station for the synchronization.

The method of the present invention and the corresponding device have the advantage that a synchronization acquisition (first synchronization after switching on the receiver) as well as a synchronization adjustment may be implemented in a simple manner when using any standard JP method.

In particular, a consideration of delay differences due to different HF processing in the forward and reverse links takes place, as well as a consideration of delay differences between the forward link channel and reverse link channel due to a variable TDD transmission channel (for example, in the case of receiver and transmitter moved relatively to each other).

According to a preferred embodiment, a plurality of different second stations exists, and an individual first and second reference signal is sent for each second station.

According to a further preferred embodiment, the second reference signal is phase-rotated in the negative direction in the first station by the phase angle of the strongest channel pulse-response component, and is advanced in time by the propagation time of the first reference signal.

According to another preferred embodiment, the first station is a base station and the second station is a mobile station of a TDD mobile radio communications system.

According to a further preferred refinement, the transmission is carried out using the CDMA method.

According to another preferred development, a plurality of data streams is transmitted simultaneously according to the CDMA method.

In another preferred embodiment, the data bursts have at least two data blocks, between which a block is arranged that is used for the reference signal.

BRIEF DESCRIPTION OF THE DRAWINGS

FIG. 1 shows an illustration of the synchronization in a JP method given delay differences in the forward and reverse links, and specifically FIG. 1a in the reverse link and FIG. 1b, and FIG. 1c in the forward link, as a specific embodiment of the present invention.

FIG. 6 shows an illustration of the shift in the moment of transmission in a known JP method given identical forward and reverse links, and specifically, FIG. 6a in the reverse link and FIG. 6b in the forward link.

FIG. 7 shows an illustration of the shift in the moment of transmission in a known JP method given delay differences in the forward and reverse links, and specifically, FIG. 7a in the reverse link and FIG. 7b in the forward link.

FIG. 8 shows an illustration of the synchronization in a known JP method given delay differences in the forward and reverse links, and specifically, FIG. 8a in the reverse link and FIG. 8b, and FIG. 8c in the forward link.

DETAILED DESCRIPTION

In the figures, identical reference symbols denote identical or functionally equivalent elements.

FIG. 1 shows an illustration of the synchronization in a JP method given delay differences in the forward and reverse links, and specifically, FIG. 1a in the reverse link and FIG. 1b, and FIG. 1c in the forward link, as a specific embodiment of the present invention.

Figure 3:
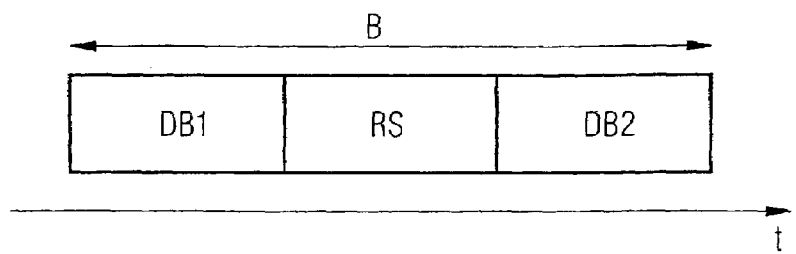
FIG. 3 shows a customary data-burst structure in a CDMA data-transmission system.
Figure 4A:
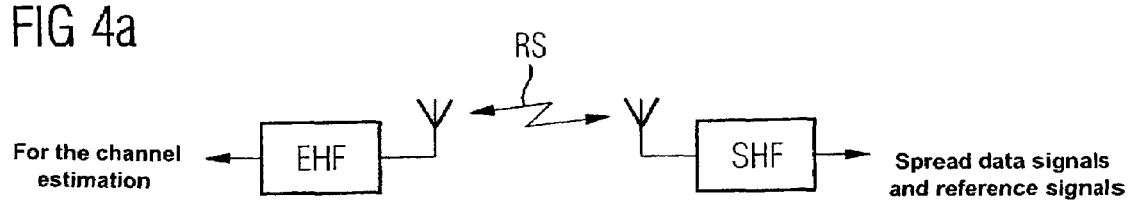
FIG. 4 shows a schematic representation of the high-frequency (HF) processing in a known CDMA data-transmission system, and specifically, FIG. 4a in the reverse link and FIG. 4b in the forward link.
Figure 4B:
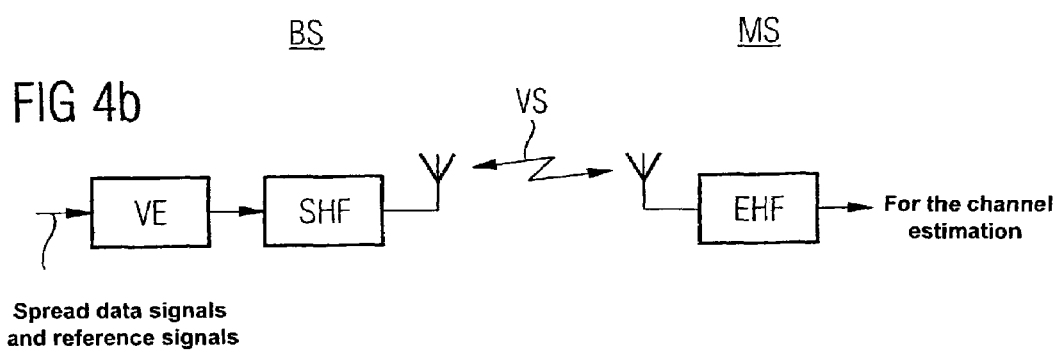
Figure 5:
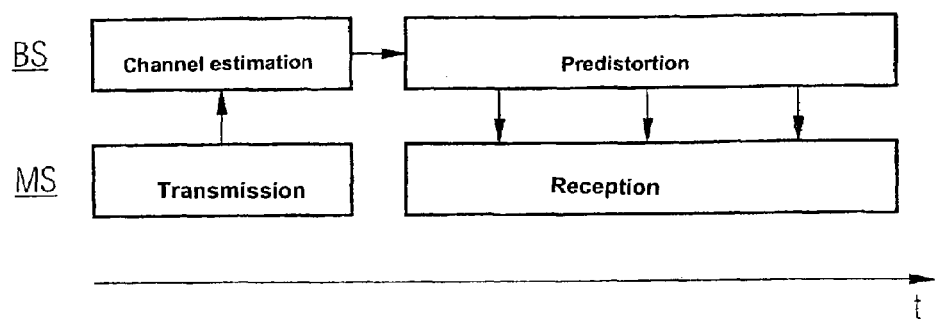
FIG. 5 shows a representation of the time sequence in the case of TDD operation with predistortion for the CDMA data-transmission system according to FIG. 4.

This exemplary embodiment concerns a cellular CDMA mobile radio communications system. A data transmission by bursts is carried out in TDD operation, with a channel estimation in the reverse link and a predistortion in the forward link. A data burst B (see FIG. 3) contains reference signals for the synchronization, namely, one reference signal per user or mobile station MS.

The later its channel pulse response has been measured in the counter link, the earlier the reference signal of a user is transmitted. Prior to the transmission to mobile station MS, the reference signal is phase-rotated in the negative direction by the phase angle of the strongest channel pulse-response component. To that end, the base station estimates the channel beforehand with the aid of a first reference signal. Going into detail, the following steps are carried out:

i) in a first step, a first reference signal is sent by mobile station MS to base station BS;

ii) in a second step, a channel estimation KS is carried out in base station BS based on the reference signal received from mobile station MS;

iii) in a third step, base station BS sends to mobile station MS a data burst B predistorted on the basis of the channel estimation;

iv) in a fourth step, base station BS sends to mobile station MS a second reference signal altered on the basis of the channel estimation; and v) in a fifth step, mobile station MS synchronizes data burst B on the basis of the second reference signal.

Prior to detection in the mobile station, the received signal is phase-rotated in the negative direction by the phase angle of the strongest channel pulse-response component of the transmit link. Different phase rotations in the forward and reverse directions are thereby compensated.

The second reference signal is sent in forward link VS earlier in time by the time $\Delta t_g$, by which the channel pulse response of reverse link RS is delayed through the reverse channel.

Prior to the transmission, the reference signal is phase-rotated in the negative direction by phase angle $\Delta \phi_g$ of the strongest channel pulse-response component of the reverse link. Mobile station MS synchronizes itself to the strongest component of its channel estimation. The synchronization phase is taken into account, in that prior to detection, the received signal is phase-rotated in the negative direction by the phase angle of the strongest channel pulse-response component of the transmit link.

Different from that described in this specific embodiment, the data signal and reference signal may be sent one after the other in time. However, for better comparability of the time relationships, the signals in FIG. 1 are drawn one below the other, thus, simultaneously.

Figure 2:
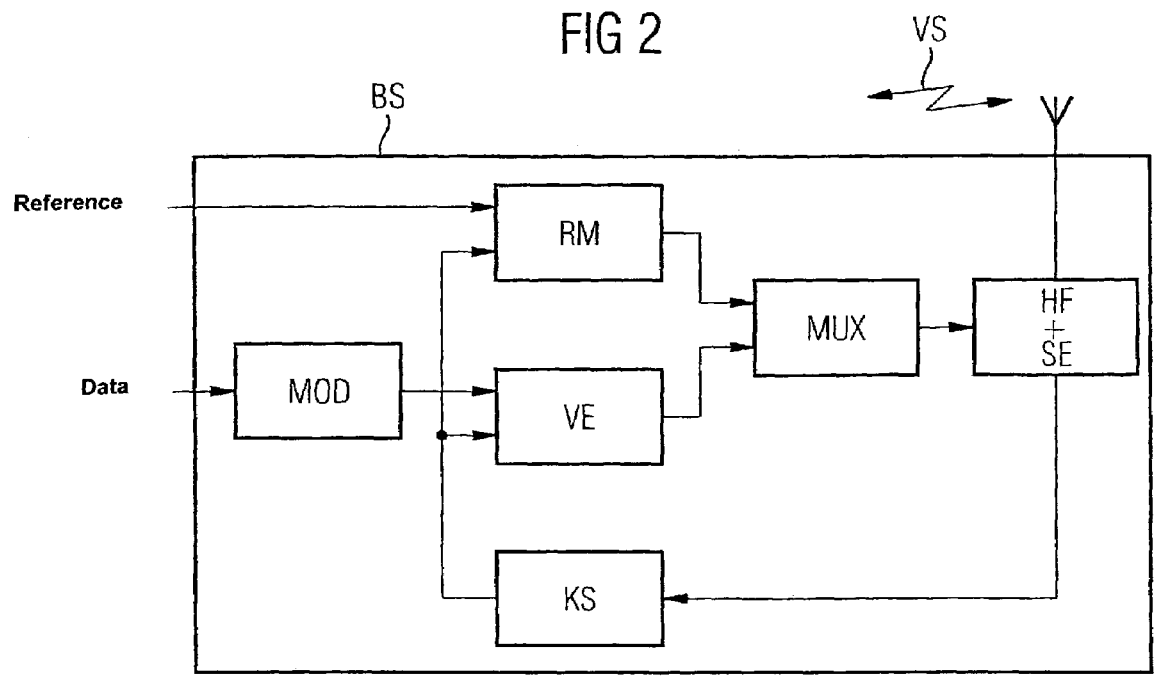
FIG. 2 shows a block diagram of a device for the synchronization of data-transmission devices, for clarifying a further specific embodiment of the present invention.

FIG. 2 shows a block diagram of a device for the synchronization of data transmission devices to clarify a further specific embodiment of the present invention, thus, for the channel estimation in the reverse link and for the transmission of the predistorted signals and the reference signals prepared for the synchronization.

In addition to the reference symbols already introduced, in FIG. 2, MOD denotes a modulator, RM denotes a reference-signal modification device, MUX denotes a multiplexer, HF denotes a high-frequency part and SE denotes a switching device for switching between transmit mode and receive mode.

In the device represented in FIG. 2, the channel estimation carried out by channel estimator KS is taken into account not only with regard to the predistortion by predistortion device VE, but also in view of the formation or modification of the reference signal, as presented in detail in FIG. 1.

Thus, a reference signal, corresponding in each case to the channel estimation, is sent by base station BS via the forward link to mobile station MS, which offers a simple possibility for the synchronization in mobile station MS, since the time correlation between the transmitting of the data signal and the transmitting of the modified reference signal is known there.

Although the present invention was described above in light of a preferred exemplary embodiment, it is not restricted to it, but is able to be modified in diverse ways.

In particular, the method of the present invention may be used in all data-transmission systems which use a transmission mode that requires the transmission of a reference signal, and is not restricted to CDMA data-transmission systems.

What is claimed is:

1. A method for synchronizing data-transmission devices, in which a data signal is transmitted as a stream of data bursts between a first station and a second station, and a first reference signal and a second reference signal are transmitted in connection with a specific one of the data bursts, the method comprising:

sending the first reference signal from the second station to the first station;

performing a channel estimation in the first station based on the first reference signal received from the second station;

causing the first station to send to the second station one of the data bursts predistorted on the basis of the channel estimation;

causing the first station to send to the second station the second reference signal altered on the basis of the channel estimation; and causing the second station to synchronize the one of the data bursts on the basis of the second reference signal.

2. The method as recited in claim 1, wherein:

the second station is one of a plurality of different second stations, and the first reference signal and the second reference signal are sent for each second station.

3. The method as recited in claim 2, further comprising:

phase-rotating the second reference signal, for a predistortion in the first station, in a negative direction by a phase angle of a strongest channel pulse-response component; and advancing in time the second reference signal by a propagation time of the first reference signal.

4. The method as recited in claim 1, wherein:

the first station is a base station, and the second station is a mobile station of a TDD mobile radio communications system.

5. The method as recited in claim 1, wherein each transmission is carried out using CDMA.

6. The method as recited in claim 1, wherein a plurality of data streams is transmitted simultaneously according to CDMA.

7. The method as recited in claim 1, wherein each data burst includes at least two data blocks between which a block is arranged that is used for one of the first reference signal and the second reference signal.

8. A device for synchronizing data-transmission devices, wherein a data signal is transmitted as a stream of data bursts between a first station and a second station, and a first reference signal and a second reference signal are transmitted in connection with a specific one of the data bursts, the device comprising:

an arrangement configured to send the first reference signal from the second station to the first station;

an arrangement configured to perform a channel estimation in the first station based on the first reference signal received from the second station;

a data burst modification device, provided in the first station, adapted for causing the first station to send to the second station one of the data bursts predistorted on the basis of the channel estimation;

a reference-signal modification device, provided in the first station, adapted for modifying the second reference signal according to a result of a channel estimation, and for causing the first station to send to the second station the modified second reference signal; and a synchronization device, provided in the second station, adapted for synchronizing the one of the data bursts according to the modified second reference signal received from the first station.

9. The device as recited in claim 8, wherein:
the second station is one of a plurality of different second stations, and
the first reference signal and the second reference signal are sent for each second station.

10. The device as recited in claim 8, wherein the modification of the second reference signal includes modifying a transmission time and a transmission phase of the second reference signal.

11. The device as recited in claim 10, wherein:
the transmission time modification of the second reference signal includes advancing in time the second reference signal by a propagation time of the first reference signal; and
the transmission phase modification of the second reference signal includes phase-rotating the second reference signal, for a predistortion in the first station, in a negative direction by a phase angle of a strongest channel pulse-response component.

12. The device as recited in claim 8, wherein:
the first station is a base station; and
the second station is a mobile station of a TDD mobile radio communications system.

* * * * *